United States Patent [19]

McDonald

[11] 4,373,120
[45] Feb. 8, 1983

[54] LINE TEST TERMINATION DEVICE

[75] Inventor: Gerald F. McDonald, Babylon, N.Y.

[73] Assignee: TII Industries Inc., Copiague, N.Y.

[21] Appl. No.: 224,680

[22] Filed: Jan. 13, 1981

[51] Int. Cl.³ .............................................. H04M 1/24
[52] U.S. Cl. .................................. 179/175; 179/81 C
[58] Field of Search ......... 179/175, 175.3 R, 175.1 R, 179/84 L, 175.2 B, 175.24, 175.25, 81 C; 324/51, 52, 53

[56] References Cited

U.S. PATENT DOCUMENTS

| | | | |
|---|---|---|---|
| 3,469,036 | 9/1969 | Meri .................................... | 179/84 L |
| 3,600,678 | 8/1971 | Garrett et al. ........................ | 179/175 |
| 3,941,950 | 3/1976 | Dunwoodie et al. ................ | 179/175 |
| 3,951,248 | 4/1976 | Feiner et al. ........................ | 179/81 C |
| 3,976,849 | 8/1976 | Champan ...................... | 179/175.3 R |
| 3,983,338 | 9/1976 | Mathauser ........................... | 179/175 |
| 4,209,671 | 6/1980 | Charles et al. .................. | 179/175.25 |
| 4,288,660 | 9/1981 | Fasano ................................ | 179/175 |

*Primary Examiner*—Thomas A. Robinson
*Attorney, Agent, or Firm*—Martin Sachs

[57] ABSTRACT

A line test termination device to provide a characteristic signature recognizable by the telephone central office when a continuity test is made on a subscriber line having a pair of electrically conductive paths includes a resistor and a diode connected in series between the conductive paths. A neon tube device placed in series with the resistor and diode will be illuminated when a ringing voltage is applied to the line and no telephone ringing circuit is connected thereto.

9 Claims, 4 Drawing Figures

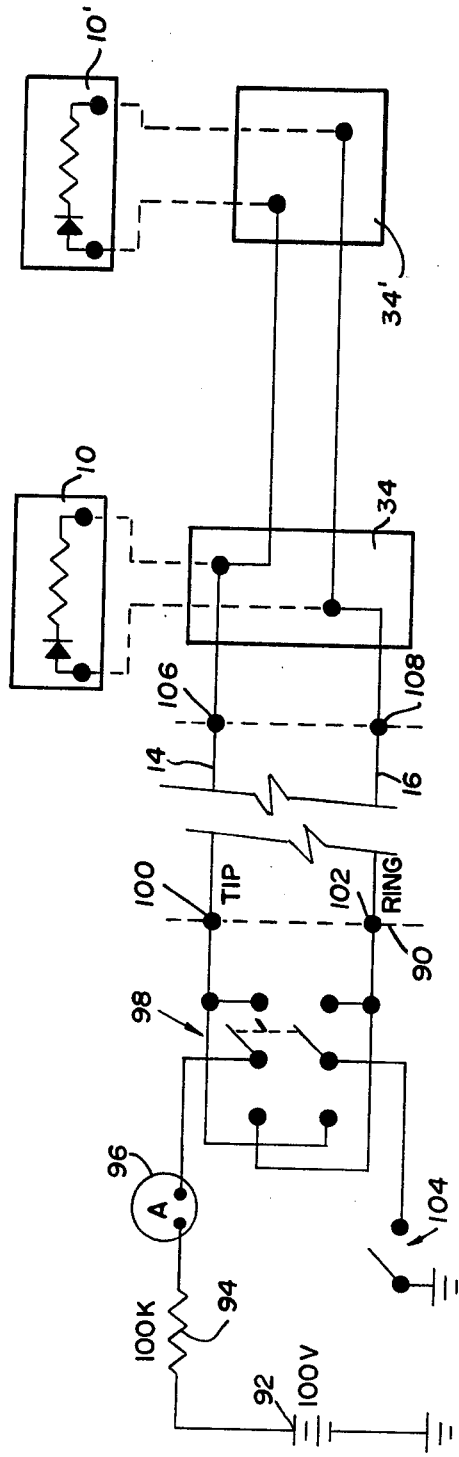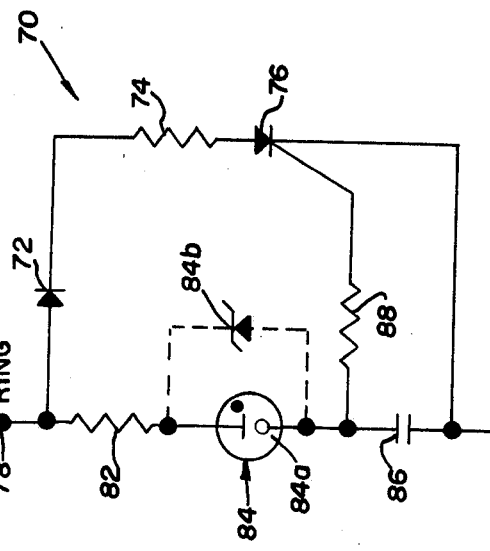
FIGURE 5
FIGURE 4

LINE TEST TERMINATION DEVICE

BACKGROUND OF THE INVENTION

1. Field of the Invention

The present invention relates to telephone line test termination devices and, in particular, to a circuit arrangement which provides a unique or characteristic signature to the central office when a continuity test is made on a subscriber line.

2. Discussion of the Relevant Art

Many different types of circuit arrangements have been suggested for use in testing telephone subscriber lines from a remote location. Generally, these circuit arrangements require installation and the appearance of a telephone installer who must physically visit the premises where the telephone is installed and then signal the central office so that the central office operator may perform the required tests to determine if the subscriber lines are in working order. Many of these circuit arrangements include a switching device and a tuned circuit which is activated from the central office. These components are unreliable and require an installer to enter the home where the telephone is located. This is unsatisfactory for numerous reasons. Generally, the devices known to the applicant are unable to remain permanently at the installed telephone, or if they are capable of being installed permanently, they require activation by an AC signal provided by the central office. This approach to the problem is unreliable and therefore unsatisfactory. A simple reliable means of providing a characteristic signature or impedance across the subscriber conducting paths which can provide an indication at the central office that the subscriber line is intact and operable by merely utilizing a DC test voltage and a reversing switch has not been disclosed heretofore.

SUMMARY OF THE INVENTION

The present invention overcomes the shortcomings of the prior art by providing a simple, inexpensive circuit arrangement which may be installed permanently at the subscriber telephone or station protector, be installed by the use of a removable plug, or may be provided with the installation of new telephone equipment by providing a characteristic impedance in the instrument plug itself.

Therefore, it is an object of the present invention to provide a simple, inexpensive circuit arrangement that may be connected across a subscriber line to yield a characteristic signature or impedance which may readily be recognized by a central office performing a continuity test.

It is another object of the present invention to provide a subscriber termination device which has a characteristic signature that may be left across the subscriber line at all times.

It is yet another object of the present invention to provide a reliable termination device for telephone subscriber lines that will yield a characteristic signature and also provide an indication when all of the subscriber telephones have been removed from the line when a ringing voltage is applied from the central office.

A line termination test device, according to the principles of the present invention, for providing a characteristic signature to the telephone central office when a continuity test is made on a subscriber line having a pair of electrically conductive paths comprises a resistor and a diode connected in series from one of the electrically conductive paths to the other of the electrically conductive paths.

The foregoing and other objects and advantages will appear from the description to follow. In the description reference is made to the accompanying drawing which forms a part hereof, and in which is shown by way of illustration a number of specific embodiments in which the invention may be practiced. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which:

FIG. 4 is a schematic circuit diagram of yet another embodiment of the instant invention; and FIG. 5 is a schematic circuit diagram of the continuity test circuit used by the central office.

DESCRIPTION OF THE PREFERRED EMBODIMENT

Figure 1:
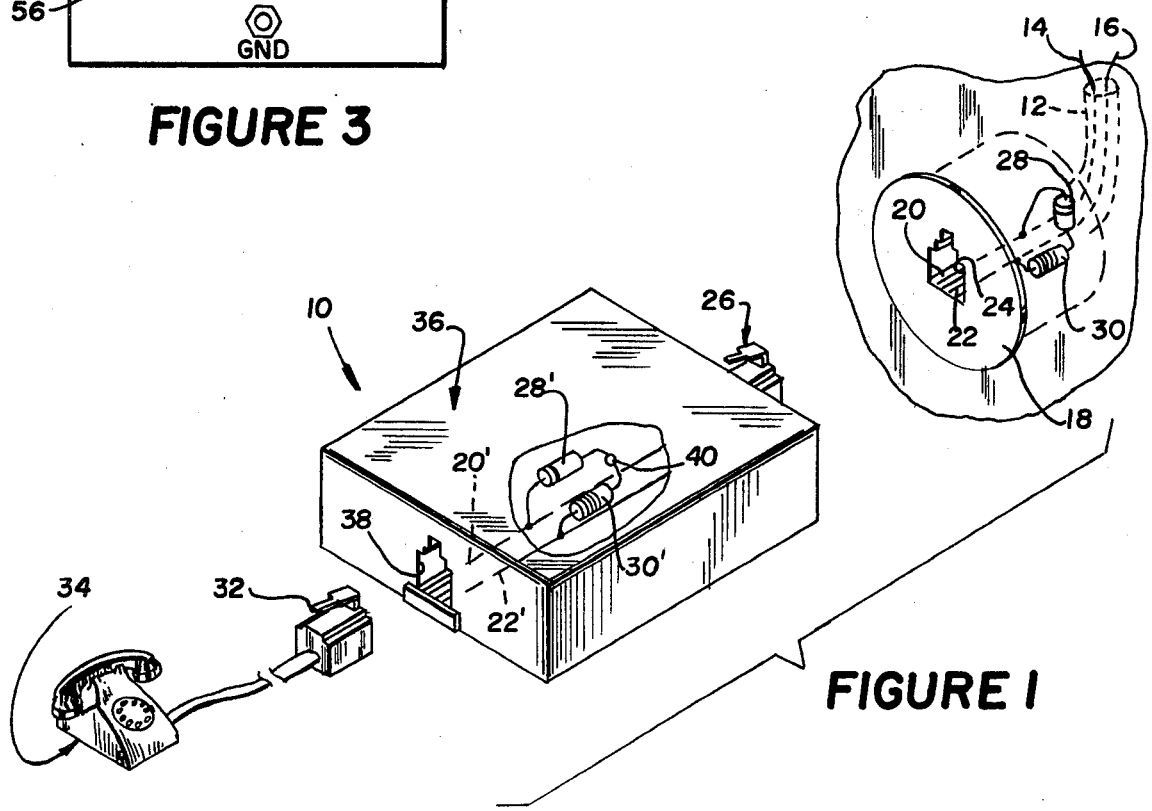
FIG. 1 is a pictorial representation, not to scale, of two embodiments of the present invention.

Referring now to the figures, and in particular to FIG. 1, which is drawn with enlarged portions there is, disclosed a plurality of line test termination devices 10 that are capable of providing the characteristic signature to the telephone central office, not shown, when a continuity test is made on a subscriber's telephone line 12 generally consisting of a pair of electrically conductive wires 14 and 16 which are connected to the central telephone office. The wires 14 and 16 are terminated by the telephone company in a wall socket 18 which provides electrically conductive contacts 20 and 22 onto which the wires 14 and 16 are affixed. The wall socket 18 is provided with an aperture 24 having an irregular shape which is adapted to mate with a conventional male plug 32 that is provided with electrically conductive contacts, not shown, that cooperate with contacts 20 and 22 of receptable 24 thereby continuing the electrically conducting path therethrough to a telephone instrument 34. The wires (electrically conductive paths) 14 and 16 have connected thereto a diode 28 and a resistor 30 connected in series thereacross in one embodiment of the instant invention. The diode 28 and resistor 30 may be affixed permanently across the wires 14 and 16 and thus, as will be explained herein, will provide a characteristic signature when interrogated by the central office. This characteristic signature will be present whether a telephone line cord plug 32, normally provided on the telephone set 34, is inserted into aperture 24 or omitted therefrom.

In an alternative embodiment, a plug 26 may be provided at one end of a housing 36 with a receptacle or socket 38 provided at the other end. Socket 38 is adapted to receive a telephone line plug 32 therein to continue the electrical conductive paths formed by wires 14 and 16 which are continued through plug 26 to the contact area of receptacle 38. A diode 28' and resistor 30' may be connected in series and connected across the conductive paths 20' and 22' in a manner similar to that used in the wall socket 18. Thus, if diode 28 and 30 were not utilized in wall socket 18, they could be installed in housing 36. When housing 36 has its plug 26 inserted into receptacle or socket 18, the characteristic signature provided by the diode and resistor connected in series across two of the conductive paths will be noted when interrogation is made by the central office. This characteristic signature will be provided whether the telephone instrument 34 is connected, via its line cord plug 32 into receptacle 38 or not. Thus tests conducted by the telephone central office will positively indicate that the subscriber telephone line is intact up to and including the housing 36. In addition, a neon light 40 may be connected in series with the resistor 30 or 30' and/or the diode 28 or 28' in order to provide a blinking light or visual indication if ringing voltage (20 cycles AC) is placed upon the subscriber line. If the neon light is observed by a subscriber, he will be made aware that his telephone is receiving a ringing voltage signal and that his telephone is not inserted into the line. Thus, a visual indication will be provided to the subscriber reminding him to insert his telephone plug into a receptacle so that the ringer in the telephone instrument can be energized. If the ringer of any telephone instrument 34 with a line cord plug 32 is inserted into a receptacle having a neon bulb or light in series with the resistor 30 or 30' and/or the diode 28 or 28', the bulb or light will not flicker with the AC ringing voltage applied thereto. Therefore any telephone instrument connected in parallel with another instrument will prevent the light from lighting and will provide an audible signal since the ringing circuit will be energized in the instrument that has its plug placed within the receptacle. The diode, neon bulb and resistor combination may be selected so that the neon bulb will flicker with the AC ringing voltage applied whether or not a line cord plug is in a receptable.

In yet another embodiment of the instant invention a resistor and diode may be connected in series and placed across the conductive wires occurring in plug 32, thereby supplying a characteristic signature to the subscriber line only when the telephone handset plug is inserted into a receptacle. This will indicate to the central office that the line is in operating condition all the way to the telephone instrument. Of course, if no telephone is plugged into the receptacle, the central office will be unable to determine whether the line is in operating condition up to the receptacle since it would be possible for the line to be broken anywhere between the central office and the receptacle at the termination point.

Figure 2:
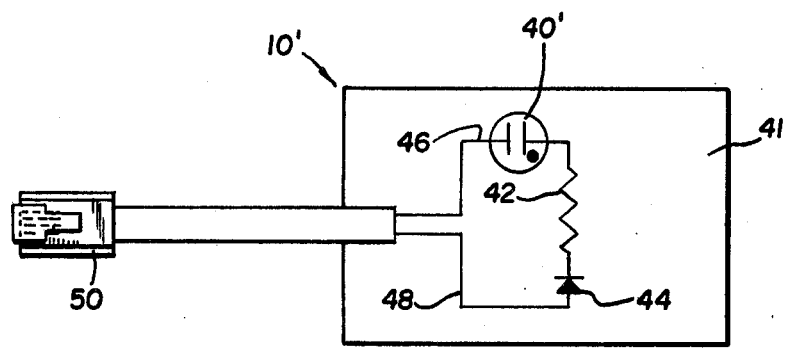
FIG. 2 is an alternative embodiment of the present invention.

Referring now to FIG. 2 which discloses an alternative embodiment of a line test termination device 10', that includes a housing 41, which may be fabricated of metal or a suitable plastic material, includes a resistor 42 connected in series with a diode 44. The resistor and diode have one end of each connected across two electrically conductive paths such as wires 46 and 48 which terminate in a plug 50 adapted to be received by a wall socket 18 provided by the telephone company and into which is normally inserted a telephone line cord plug 32 (FIG. 1). Wires 46 and 48 continue the electrically conductive paths provided by wires 14 and 16 and when plugged into socket 18 provide a characteristic signature as is provided by the earlier described embodiments. The embodiment of 10' described in FIG. 2 may be installed by a telephone repairman when making an initial call at an installation for any purpose, providing the central office with a means for checking continuity of the subscriber line, and then removed. Alternatively, a subscriber may insert plug 50 into socket 18 when he removes the telephone instrument or when he moves to a new location. A neon light 40' may be connected in series with resistor 42 and diode 44 to provide a visual indication when AC ringing voltage is present.

Figure 3:
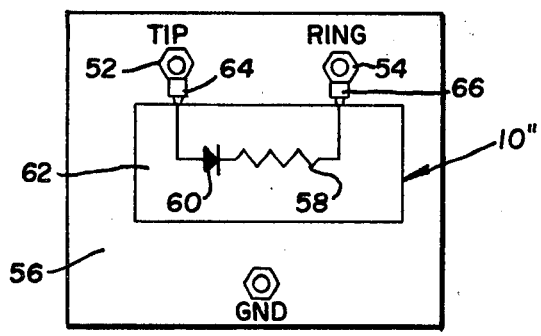
FIG. 3 is another embodiment of the present invention utilized in combination with a conventional voltage arrester.

FIG. 3 discloses yet another alternative embodiment of the line test termination device 10" which may be mounted upon terminals 52 and 54 of an existing station protector 56. The termination device 10" includes a resistor 58 connected in series with a diode 60 and is embodied in a weathertight housing 62 which has two spade lugs 64 and 66 extending outwardly therefrom. The spade lugs are electrically connected to one end of diode 60 and one end of resistor 58 which are connected across the tip (terminal 52) and ring (terminal 54) of the station protector 56 thereby providing a characteristic signature up to the point of the station protector. Thus, interrogation by the central office will indicate that the subscriber line is in satisfactory operating condition up to that point.

The resistor 58 and diode 60 may also be incorporated within the housing of a station protector and be permanently mounted therein, such as the station protector module manufactured by the TII Corporation of Copiague, New York as model numbers TII-355 or TII-356 or the station protector base known as model numbers TII-325, TII-326, TII-328 or TII-329, thereby providing a characteristic signature to the line and may be installed at the same time as the station protector device.

Preferably resistors 30, 30', 42, and 58 are approximately 1 megohm in value and the diodes 28, 28', 44, and 60 are chosen to be capable of reliably blocking the conventional test voltage of 100 volts DC.

A further alternative embodiment of the instant invention of a line test termination device 70 is disclosed in FIG. 4. The device 70 may be installed in any of the configurations as disclosed for the device 10 or 10'. The device 70 is seen to include a diode 72 connected in series with a resistor 74 and in series with the anode and cathode electrodes of a silicon controlled rectifier (SCR). The anode electrode of diode 72 is connected to terminal 78 which may be the ring terminal on a protector device and the cathode electrode of SCR 76 is connected to terminal 80 which may be the tip terminal of a station protector device, not shown. Terminals 78 and 80 may also be connected to the subscriber wires passing through the housing as disclosed in FIG. 1 or the wall socket 18 shown therein. A second resistor 82 is connected in series with a voltage breakover device 84, which may be a neon bulb 84a or a zener diode 84b, which is further connected in series with a capacitor 86 whose other end is connected to terminal 80. A third resistor 88 is connected from the juncture of the voltage breakover device 84 and capacitor 86 to the gate electrode of SCR 76. The operation of this embodiment will be described in conunction with the test circuit arrangement as set forth in FIG. 5.

FIG. 5 discloses a test circuit arrangement utilized by the telephone central office to interrogate a subscriber line in order to determine if the line is in operating order and is not broken or open somewhere between the central office and the subscriber's home. All of the items shown to the left of dotted line 90 are generally located at the telephone central office at the test station and include a DC voltage source 92 (approximately 100 volts) which has a series current limiting resistor 94 of approximately 100,000 ohms connected in series with an ammeter 96 and a polarity reversing voltage switch 98 connected to terminals 100 and 102. Switch 104 is also included to complete the test circuit path. The subscriber telephone lines 14 and 16 are connected to terminals 100 and 102 respectively at the central office and are connected to terminals 106 and 108 at the subscriber's end where the telephone instrument 34 is to be installed. Any number of telephone instruments 34 or 34' may be connected in parallel in a conventional manner. Each of the telephone instrument terminations may include a line test termination device 10 or 10' connected across the instrument conductive wires as shown in FIG. 1, thereby providing the characteristic signature as described hereinbefore.

With the present utilization of telephone plugs and jacks by the telephone companies the instant invention is ideally suited for the use therewith as explained hereinbefore since the telephone subscriber is encouraged to install his own telephone instrument, however the telephone line must be checked by the central office in order to determine its suitability for use. These tests, which are made by the central office test desk, determine if the subscriber line is open, shorted, grounded or has a foreign battery on it. Without a telephone set and its associated ringer connected to the line, the test for continuity (open circuit) cannot be reliably made unless telephone personnel are dispatched to the consumer's location to assist in performing the test. With the instant invention, this shortcoming is overcome. The central office may now check the subscriber line up to the point where a line test termination device has been installed. The central office test desk makes the loop continuity test by accessing the subscriber line in the conventional manner and operates the ground key (switch 104) on the test board. This applies plus 100 volts DC in series with the 100K resistor (94) to the tip side of the subscriber's line and provides ground to the ring side of the line. By operating the reverse key or switch 98, these connections are changed so that the plus voltage is applied to the ring side of the subscriber line and the ground is applied to the tip side of the subscriber line.

A good subscriber line without a station termination device 10 or 10' connected to it will cause a test board meter reading (96) of zero deflection (except that a brief meter "kick" will be observed while the ringing capacitor charges if it is connected to the line during this test). Operating the reverse key (switch 98) while keeping the ground key (switch 104) closed will also produce the same effect. If no ringer is connected, it cannot be determined from the "0" meter reading if the line has continuity to the station protector or to the telephone jack at the subscriber location. If a short circuit occurred anywhere along the tip or ring conductors of the line, the meter reading would be somewhere between "0" and "100" and would not change when the reverse switch 98 is operated.

If a line test termination device as disclosed hereinabove is installed at the subscriber location, the telephone office test desk meter 96 will now read either "0" or "10" on a good line. By operating the reverse key 98 the meter reading will change either from "0" to "10" or from "10" to "0". Observing the special dual signature of the station termination device by the central office test desk assures continuity of the line up to the point where the telephone termination device has been installed. This dual signature also prevents the device signature from being confused with an actual line trouble. If the line has a short circuit between the tip and ring sides, the meter will read somewhere between "0" and "100" and will not be polarity sensitive.

After the central office has completed the test, there are many options which can be employed depending upon the type of device which has been installed. Either the termination device may be left in place if it is the type as disclosed in FIG. 1 which includes housing 36, since the telephone instrument 34 may be installed directly into the aperture provided therein. It may be also left in place if the termination device was included in socket 18. Again, the termination device would be left permanently installed if it were included in plug 32. However, if the termination device as shown in FIG. 2 were to be installed, it would have to be removed in order to provide a place to insert the telephone instrument plug 32 therein. Obviously, if the line termination device 10' were used across a station protector 56, it may remain in position permanently. Leaving the station termination device connected will not adversely affect the operation of the subscriber line because of the value of the resistor being approximately 1 megohm which is sufficiently large not to interfere with the normal resistance that is found in the telephone subscriber line. In addition, the instant station termination device is capable of determining that the continuity of the tip and ring lines have not been interchanged at some point between the central office and the station protector of the telephone jack. This test is accomplished by simply noting the position of the reverse key 98 together with the meter reading so that a meter reading of "10" occurs with the reverse key always being in the same position. This will indicate that the line pair is correctly connected in the customer location.

When the polarity reversing switch 98 is in the position which places plus 100 volts DC on terminal 78 and ground (0 volts) on tip terminal 80, the capacitor 86 (FIG. 4) will start to charge to a DC voltage level because the voltage breakover device 84 will be caused to conduct, since the DC voltage applied is greater than the voltage breakover of the breakover device. As soon as approximately one volt or slightly higher appears across the capacitor 86, SCR 76 will be caused to fire (breakover) therefore providing a continuous path from terminal 78, via diode 72, resistor 74, the anode and cathode electrodes of SCR 76 to terminal 80, permitting current to flow from the voltage source 92 through resistor 94 and ammeter 96. When reversing switch 98 is thrown to the opposite position putting 0 volts on terminal 78 and plus 100 volts on terminal 80, no current can flow after initial inrush current in capacitor 86, because the blocking diode 72 will prevent current from flowing in the path just described and SCR 76 can not be turned on because the voltage appearing across capacitor 86 is of the wrong polarity. If a zener diode 84b is utilized as the voltage breakover device, resistor 82 will be sufficiently large to cause an insignificant amount of current to flow between the terminals 80 and 78.

Hereinbefore has been disclosed a line test termination device which is inexpensive to manufacture and is readily incorporated into presently existing telephone line cord plugs and jacks. It will be understood that various changes in the details, materials, arrangement of parts and operating conditions which have been herein described and illustrated in order to explain the nature of the invention may be made by those skilled in the art within the principles and scope of the present invention.

Having thus set forth the nature of the invention, what is claimed is:

1. A line test termination device for providing a characteristic signature to the telephone central office when a continuity test is made on a subscriber line having a pair of electrically conductive paths comprising:
   (a) a resistor;
   (b) a diode connected in series with said resistor from one of said electrically conductive paths to the other of said electrically conductive paths; and
   (c) a housing adapted to receive a telephone instrument plug therein and continue the electrically conductive paths to said telephone instrument, said resistor and said diode being disposed in said housing.

2. A line test termination device according to claim 1 wherein said housing is separable into two parts, the first part
   (i) having said resistor and diode disposed therein,
   (ii) being adapted to receive a telephone instrument plug therein, and
   (iii) continue both said electrically conductive paths, the second part of said housing,
   (i) being adapted to receive said telephone instrument plug therein, and
   (ii) continue both electrically conductive paths to said telephone instrument.

3. A line test termination device for providing a characteristic signature to the telephone central office when a continuity test is made on a subscriber line having a pair of electrically conductive paths comprising:
   (a) a resistor;
   (b) a diode; and
   (c) a housing, said housing having a pair of electrically conductive paths therein for continuing the conductive leads of a telephone instrument, said resistor and said diode being connected in series from one of said conductive paths to the other of said conductive paths, said housing being adapted to be received by a telephone receptacle terminating said subscriber line for continuing said conductive paths.

4. A line test termination device according to claim 3 further including:
   (a) a silicon controlled rectifier (SCR) having anode, cathode and gate electrodes, said SCR being connected in series with said resistor and diode with the anode electrode of said SCR being coupled to the cathode electrode of said diode, the cathode electrode of said SCR being connected to one of said electrically conductive paths and the anode electrode of said diode being connected to said other electrically conductive path; and
   (b) a second resistor;
   (c) a voltage breakover device;
   (d) a capacitor having two terminals, said second resistor, said voltage breakover device and said capacitor being connected in series, one terminal of said capacitor being connected to said SCR cathode electrode, the other terminal of said capacitor being coupled to said SCR gate electrode, via a third resistor, said voltage breakover device and said second resistor being serially connected from the other terminal of said capacitor to said diode anode electrode.

5. A line test termination device according to claim 4 wherein said voltage breakover device is a gas tube.

6. A line test termination device according to claim 4 wherein said voltage breakover device is a semiconductor device.

7. A line test termination device according to claim 4 wherein said voltage breakover device is a zener diode, the anode electrode of said zener diode being coupled to said capacitor other terminal and said cathode electrode being coupled to said diode anode electrode.

8. A line test termination device for providing a characteristic signature to the telephone central office when a continuity test is made on a subscriber line having at least two electrically conductive paths, comprising:
   (a) a housing having a plug portion adapted to cooperate with a telephone jack for receiving a telephone line cord therein, a jack portion adapted to cooperate and receive a telephone line cord therein, said housing including at least two electrically conductive paths being continuous from said jack portion to said plug portion for continuing said conductive paths;
   (b) a resistor; and
   (c) a diode connected in series with said resistor, said resistor and diode disposed within said housing, said diode and resistor being connected from one of said conductive paths to the other of said conductive paths.

9. A line test termination device according to claims 2, 3 or 8 further including a neon tube device connected in series with said resistor and said diode.

* * * * *